(12) United States Patent
Lin et al.

(10) Patent No.: US 9,276,623 B2
(45) Date of Patent: Mar. 1, 2016

(54) COST EFFECTIVE MULTIBAND RF FRONT-END ARCHITECTURE FOR MOBILE APPLICATIONS

(71) Applicant: Aviacomm Inc., Sunnyvale, CA (US)

(72) Inventors: Shao C. Lin, Santa Clara, CA (US); Shih Hsiung Mo, San Jose, CA (US)

(73) Assignee: AVIACOMM INC., Sunnyvale, CA (US)

( * ) Notice: Subject to any disclaimer, the term of this patent is extended or adjusted under 35 U.S.C. 154(b) by 109 days.

(21) Appl. No.: 13/971,174

(22) Filed: Aug. 20, 2013

(65) Prior Publication Data

US 2015/0056941 A1    Feb. 26, 2015

(51) Int. Cl.
*H04B 1/06* (2006.01)
*H04B 7/00* (2006.01)
*H04B 1/18* (2006.01)

(52) U.S. Cl.
CPC ........................................ *H04B 1/18* (2013.01)

(58) Field of Classification Search
CPC ............................. H04B 1/0007; H04B 1/0003
USPC .................. 455/68, 88, 126–127.5, 230–254, 455/552.1, 553.1
See application file for complete search history.

(56) References Cited

U.S. PATENT DOCUMENTS

| | | | | |
|---|---|---|---|---|
| 4,969,121 A * | 11/1990 | Chan et al. | ..................... | 710/113 |
| 5,463,603 A * | 10/1995 | Petersen | .......... | G11B 20/10009 360/61 |
| 5,604,870 A * | 2/1997 | Moss | .................... | G06F 13/105 703/23 |
| 7,603,514 B2 * | 10/2009 | Ooi | ........................ | G06F 3/0607 710/5 |
| 7,969,222 B2 * | 6/2011 | Bouras | ..................... | H04B 1/30 327/307 |
| 8,526,995 B2 * | 9/2013 | Ripley | ..................... | H04B 1/40 330/307 |
| 2006/0135195 A1 * | 6/2006 | Leinonen | ............. | H04B 1/0057 455/550.1 |
| 2006/0224792 A1 * | 10/2006 | Ooi | ........................ | G06F 3/0607 710/62 |
| 2007/0066259 A1 * | 3/2007 | Ryan | ..................... | H03G 3/3078 455/234.1 |
| 2012/0071118 A1 * | 3/2012 | Ripley | ..................... | H04B 1/40 455/126 |

* cited by examiner

*Primary Examiner* — Edward Urban
*Assistant Examiner* — Rui Hu
(74) *Attorney, Agent, or Firm* — Shun Yao; Park, Vaughan, Fleming & Dowler LLP

(57) ABSTRACT

One embodiment of the present invention provides an RF front-end system. The RF front-end system includes one or more RF front-end components and a programmable logic device, which has a baseband interface for coupling to a baseband digital signal processor (DSP), and a set of component interfaces for coupling to the one ore more RF front-end components. The programmable logic device is configured to: receive, from the baseband DSP via the baseband interface, a command which includes an address and a control signal; identify a component interface from the set of component interfaces based on the address; and send the control signal to the identified component interface, thereby enabling the baseband DSP to control a front-end component coupled to the programmable logic device via the identified component interface.

10 Claims, 5 Drawing Sheets

COST EFFECTIVE MULTIBAND RF FRONT-END ARCHITECTURE FOR MOBILE APPLICATIONS

BACKGROUND

1. Field

The present disclosure relates generally to a radio frequency (RF) front-end for a wireless communication system. More specifically, the present disclosure relates to a multiband RF front-end that uses a programmable logic chip to interface between the baseband chip and other RF front-end components, which increases flexibility and reduces cost.

2. Related Art

Traditional wireless communication systems are usually designed for a specific standard, such as GSM (Global System for Mobile Communications), Wideband Code Division Multiple Access (W-CDMA), Wi-Fi® (registered trademark of Wi-Fi alliance of Austin, Tex.), LTE (Long Term Evolution), just to name a few. Current demand for the convergence of wireless services, so that users can access different standards from the same wireless device, is driving the development of multi-standard and multi-band transceivers, which are capable of transmitting/receiving radio signals in the entire wireless communication spectrum (most are in a frequency range of from 300 MHz to 3.6 GHz).

The multi-standard requirement means an increased number of components (such as filters, switches, amplifiers, etc.) and, thus, an increased number of control signals sent from baseband chip to the RF front-end.

SUMMARY

One embodiment of the present invention provides an RF front-end system. The RF front-end system includes one or more RF front-end components and a programmable logic device, which has a baseband interface for coupling to a baseband digital signal processor (DSP), and a set of component interfaces for coupling to the one ore more RF front-end components. The programmable logic device is configured to: receive, from the baseband DSP via the baseband interface, a command which includes an address and a control signal; identify a component interface from the set of component interfaces based on the address; and send the control signal to the identified component interface, thereby enabling the baseband DSP to control a front-end component coupled to the programmable logic device via the identified component interface.

In a variation on this embodiment, the baseband interface includes one of: a serial peripheral interface (SPI), an I²C interface, a general purpose input/output interface, and a serial one-wire interface.

In a variation on this embodiment, the programmable logic device includes at least one of: a complex programmable logic device (CPLD), a field-programmable gate array (FPGA), and a programmable logic device (PLA).

In a variation on this embodiment, the set of component interfaces include one or more of: a serial peripheral interface (SPI), an I²C interface, a general purpose input/output interface, and a serial one-wire interface.

In a variation on this embodiment, the command includes at least one of: a write command and a read command.

In a further variation, the programmable logic device is further configured to: in response to the read command, obtain a status reading from the identified component interface for the front-end component; and send the status reading to the baseband DSP via the baseband interface.

In a variation on this embodiment, the RF front-end components include one or more of: one or more of integrated circuit (IC) chips, a power management unit, an antenna tuner, a filter, a band-selection switch, an operation mode switch configured to switch between a time division duplex (TDD) mode and a frequency division duplex (FDD) mode, a power amplifier, a low-noise amplifier, a power detector, and an automatic gain control (AGC) circuitry.

In a further variation, the IC chips includes at least one transceiver IC chip.

In a variation on this embodiment, the programmable logic device further comprises an additional baseband interface to enable a slow write/read operation between the baseband DSP and the programmable logic device.

In a variation on this embodiment, they system further includes an RF IC chip situated between the baseband DSP and the programmable logic device. The RF IC chip is configured to: receive, from the baseband DSP, a second command; determine whether a second address included in the second command is within a predetermined range; and in response to determining the second address being outside of the predetermined range, forward the second command to the programmable logic device.

In a further variation, the RF IC chip is further configured to: in response to determining the second address being within the predetermined range, identifying an RF IC component within the RF IC chip based on the second address; and forward a control signal within the second command to the identified RF IC component.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

Embodiments of the present invention provide a multiband RF front-end architecture. More specifically, the RF front-end includes a number of RF IC chips, a number of discrete RF front-end components, and a programmable logic chip, such as a complex programmable logic device (CPLD). The programmable logic chip is is used to provide a control interface between a baseband chip and the RF front-end, which includes the RF IC chips and the various discrete front-end components. The coupling between the programmable logic chip and the baseband chip is provides by a standard Serial Peripheral Interface (SPI) bus. This arrangement significantly simplifies the design of the baseband chip. Each individual RF front-end module (including the IC chips and the discrete components) can be coupled to the programmable chip, and is mapped to an address. The baseband chip controls each individual RF front-end module by writing/reading to a corresponding address.

In this disclosure, the term "RF front-end component" or "RF front-end module" can refer to any component or module between the antenna and the digital baseband system in a radio. The front-end components or modules can include switches, filters, amplifiers, mixers, analog-to-digital converters (ADCs), digital-to-analog converters (DACs), RF IC chips, etc. The term "RF IC" can refer to an integrated circuit (IC) that includes one or more of the front-end components. An exemplary RF IC chip can be a transceiver IC chip, which may include modulators and filters.

RF Front-End Control Interface

Figure 1:
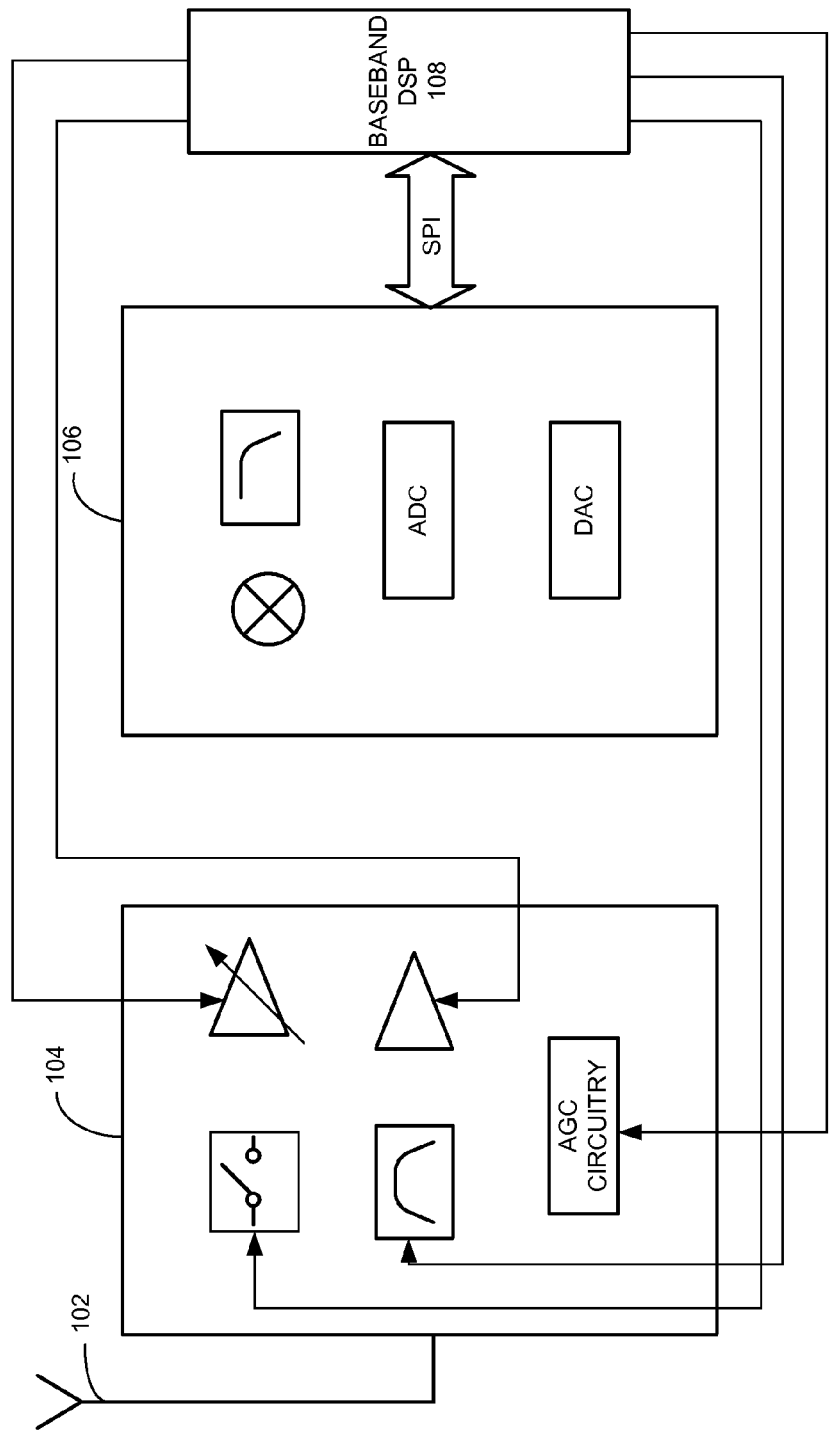
FIG. 1 presents a diagram illustrating the architecture of a conventional wireless transceiver.

FIG. 1 presents a diagram illustrating the architecture of a conventional wireless transceiver. In FIG. 1, transceiver 100 includes an antenna 102, an RF front-end block 104, an RF integrated circuit (IC) chip 106, and a baseband digital signal processor (DSP) chip 108. RF front-end block 104 includes a number of individually packaged, off-the-shelf RF front-end components, such as switches (for frequency band and operation mode selection), band-pass filters (BPFs), amplifiers (including low-noise amplifiers (LNAs) and power amplifiers (PAs)), automatic gain control (AGC) circuitry, etc. In general, RF IC chip 106 may include other transceiver components that are integrated on a single IC chip, such as modulators/demodulators, filters, analog-to-digital converters (ADCs), digital-to-analog converters (DACs), etc. Note that for a multi-band, multi-standard transceiver, such as a transceiver that is capable of operating over the entire wireless communication spectrum (from 300 MHz to 3.6 GHz), the number of components in RF front-end block 104 and RF IC chip 106 can be relatively large. Some transceivers may include tens of, or even up to 100, RF front-end components.

Operations of transceiver 100 involve baseband DSP 108 sending various control signals to and receiving feedback signals from the various front-end components in RF front-end block 104 and the various components on RF IC chip 106. When designing RF IC chip 106, special care can be taken to ensure that a standard interface, such as a Serial Peripheral Interface (SPI) bus, can be used to enable baseband DSP 108 to control the various components, such as modulators/demodulators and ADCs/DACs, located on RF IC chip 106. However, as shown in FIG. 1, in conventional wireless transceiver 100, the interface between baseband DSP 108 and the various discrete front-end components often relies on dedicated I/O pins, with each front-end component under control requiring two or three dedicated I/O pins from baseband DSP 108. The increased number of RF front-end components means an increased number of I/O pins needed by baseband DSP 108. For example, in order for baseband DSP 108 to control 50 RF front-end components, it may need to have up to 100 dedicated I/O pins. Such a large number of I/O pins can become the main limiting factor for design of compact, low-cost application-specific integrated circuit (ASIC) chips for baseband DSPs because, to accommodate such a large number of pins, the die size and page size of the ASIC chips need to be relatively large, thus driving up the cost. More importantly, with dedicated I/O pins for each RF front-end component, the baseband DSP chip lacks the flexibility and expandability to meet the growing capacity demand. Note that with the emergence of Long Term Evolution (LTE) services, a transceiver needs to support more and more frequency bands as more countries adopt this technology. Moreover, mobile device manufacturers may address the need for increased performance and functionality by introducing new types of components for use in RF front-ends, which also increases the component count in the RF front-end. Although the designer of the baseband DSP chip may have reserved extra pins that can be used to control additional RF front-end components, as the number of required frequency bands increases, these extra pins may run out, thus making redesign of baseband chips necessary.

An alternative solution for controlling front-end components is to have baseband DSP chip 108 send commands to RF IC chip 106, which can in turn control the front-end components via a common interface, such as a Mobile Industry Processor Interface (MIPI) RF Front-End Control Interface (RFFE), on behalf of baseband DSP 108. The MIPI RFFE interface allows a master device to control up to 15 slaves on a single RFFE bus (which includes three control lines). However, currently there are few commercial off-the-shelf RF front-end components that are MIPI RFFE ready. As a result, the current control interface between the baseband chip and the RF front-end components relies on a mixture of dedicated I/O pins and MIPI RFFE, which still lacks the desired flexibility and expandability.

To address the need for a flexible and scalable control interface between the baseband chip and the RF front-end components, embodiments of the present invention provide a solution that uses a programmable logic chip as a bridge between the baseband chip and the FR front-end components.

Figure 2:
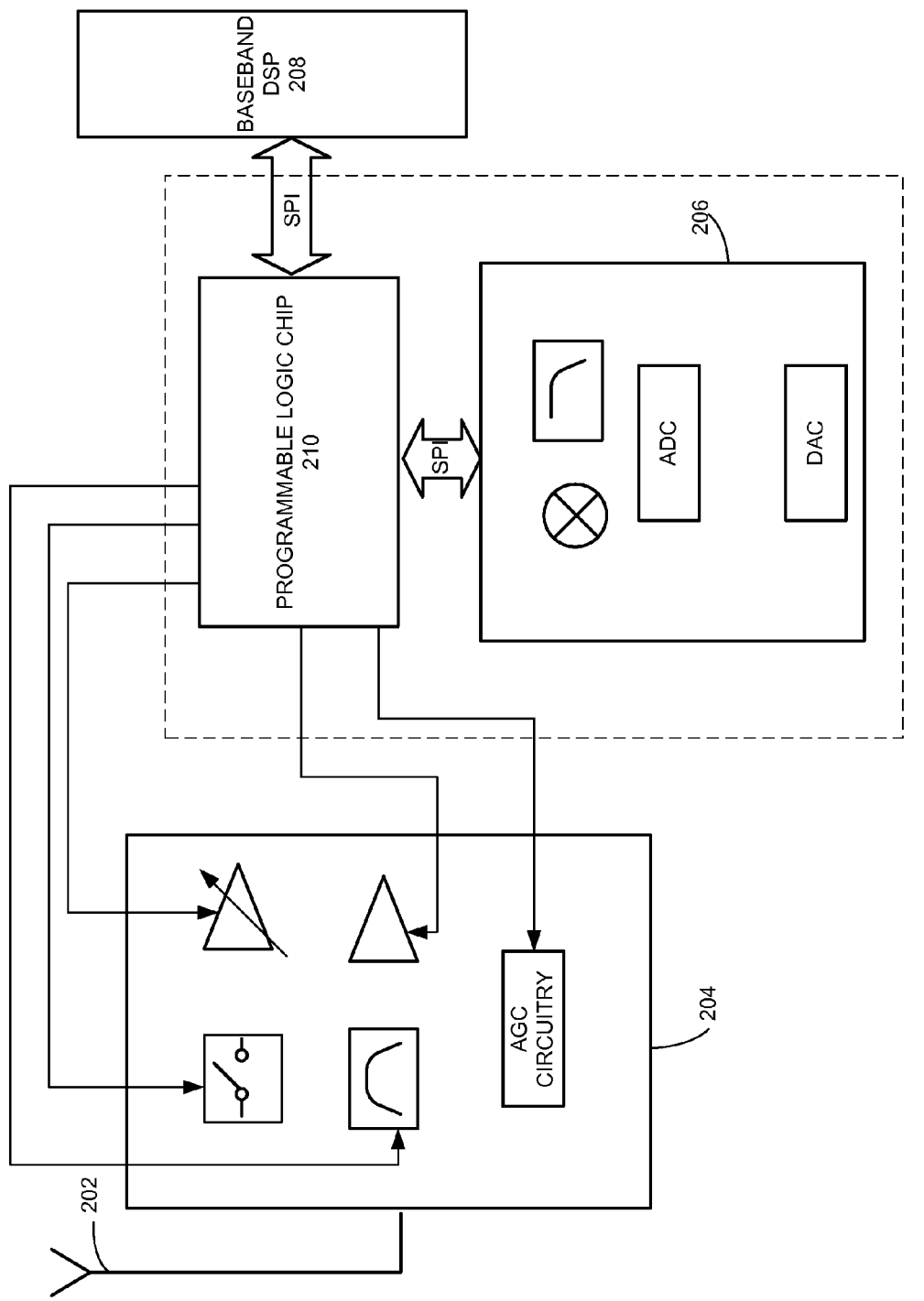
FIG. 2 presents a diagram illustrating the architecture of an exemplary wireless transceiver, in accordance with an embodiment of the present invention.

FIG. 2 presents a diagram illustrating the architecture of an exemplary wireless transceiver, in accordance with an embodiment of the present invention. In FIG. 2, transceiver 200 includes an antenna 202, an RF front-end block 204, an RF integrated circuit (IC) chip 206, a baseband digital signal processor (DSP) 208, and a programmable logic chip 210.

In FIG. 2, instead of directly controlling RF front-end components on RF front-end block 204, baseband DSP chip 208 sends control commands to programmable logic chip 210, which interfaces with baseband DSP chip 208 via a standard interface, such as an SPI bus, also known a four-wire bus. Programmable logic chip 210 also interfaces with each individual front-end component in a way that suits the specification of the component. For example, if a front-end component requires dedicated I/O pins, programmable logic chip 210 then interfaces with that component using dedicated I/O pins. On the other hand, if a front-end component is MIPI RFFE ready, programmable logic chip 210 can then interface with that component via a MIPI RFFE interface. Other types of interface are also possible, including but not limited to: I-squared-C ($I^2C$), general purpose input/output (GPIO), one-wire bus, three-wire serial bus, etc. Programmable logic chip 210 may be implemented as various types of programmable logic device, including but not limited to: a complex programmable logic device (CPLD), a programmable array logic (PAL) device, a field-programmable gate array (FPGA) circuit, etc.

Each front-end component that interfaces with programmable logic chip 210 can be mapped to an address, and signals for controlling a component can be sent to the component by writing to the address that corresponds to the component. Similarly, the status of the component can be obtained by reading from the corresponding address. For example, if baseband DSP chip 208 attempts to send a control command to the AGC circuitry, it needs to first find out the address of the AGC circuitry that is mapped by programmable logic chip 210, and then sends a write command to that address. Based on the address, programmable logic chip 210 identifies which I/O pins couple to the AGC circuitry, and then relays the control signal to the AGC circuitry via the identified I/O pins. Note that depending on the specifications of the front-end component, appropriate control signals are sent. For example, a control signal for a switch may be a simple binary signal for "on" and "off," whereas a control signal for an AGC circuitry may involve multi-level signals.

In some embodiments, the address mapping can be programmed into programmable logic chip 210 before the front-end component is coupled to. For example, programmable logic chip 210 may map certain I/O pins to a particular address, and a front-end component that is coupled to programmable logic chip 210 via those I/O pins would be automatically mapped to the address. In some embodiments, the address mapping is programmed after the front-end component is coupled to programmable logic chip 210. Moreover, based on the specifications of the front-end component, programmable logic chip 210 is programmed to ensure that appropriate control signals can be delivered to the front-end component. To enable simultaneous write/read operations, in some embodiments, the interface between baseband DSP chip 208 and programmable logic chip 210 can include two sets of SPI buses.

In addition to the RF front-end components, programmable logic chip 210 may also interface with RF IC chip 206 in order to relay control signals from baseband DSP 208 to components on RF IC chip 206. In one embodiment, a standard interface, such as SPI, can be used to couple RF IC chip 206 to programmable logic chip 210. Like controlling the RF front-end components, components on RF IC chip 206 can also be mapped to different addresses on programmable logic chip 210, which is in charge of forwarding the command to the components based on the address. In one embodiment, each component on RF IC chip 206 can be identified by an SPI address (which can be indicated by chip-select signals). For example, if there are 10 components of RF IC chip 206, programmable logic chip 210 may include 10 chip-select lines, each for a component on RF IC chip 206. In an alternative embodiment, RF IC chip 206 directly interfaces with baseband DSP chip 208 via an SPI interface. Baseband DSP 208 may include multiple SP chip-selection lines, one for selecting programmable logic chip 210 and the others for selecting components on RF IC chip 206. In one embodiment, programmable logic chip 210 and RF IC chip 206 may be co-located on a same printed circuit board (PCB). In a further embodiment, programmable logic chip 210 and RF IC chip 206 can be integrated on a same IC chip with built-in control logic.

Note that by inserting a programmable logic chip between the baseband chip and the RF front-end components, embodiments of the present invention allow simple and flexible baseband chip designs. The designer of the baseband chip no longer needs to consider the various different interface requirements of the different RF front-end components. Instead, the baseband chip can adopt a standard interface that can be used to control different types of front-end components, and only needs to provide control signals for that standard interface. In addition, there is no longer a need to reserve extra I/O pins on the baseband chip in order to meet the demand for additional RF front-end components. The demand for more front-end components can be met by increasing the size or number of pins of the programmable logic chip, which is much cheaper than trying to increase the size or number of pins of the baseband chip. Another advantage of adopting the programmable logic chip is the decreased trace length for the control lines. In the conventional transceiver shown in FIG. 1, due to the large distance between the RF front-end components and the baseband chip, the trace length of the control lines can be quite long, thus increasing PCB routing complexity. In embodiments of the present invention, the programmable logic chip can be placed close to the front-end components, thus significantly reducing the PCB routing complexity. Moreover, low-cost, large-capacity, highly integrated programmable logic chips, such as CPLDs or PLAs, are widely available, making this a preferred solution for achieving low-cost, compact transceivers that meet the increasing demand for frequency bands.

Figure 3:
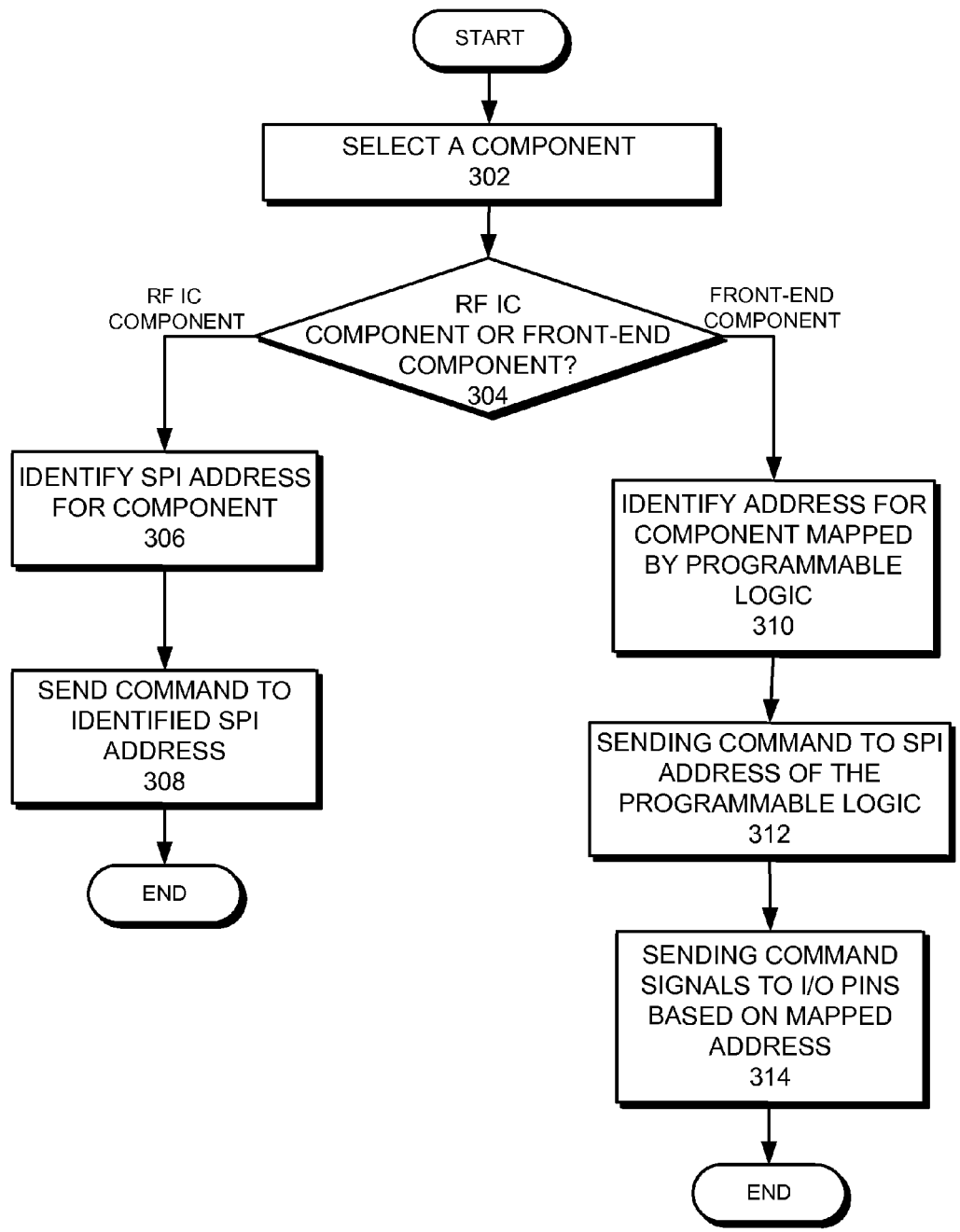
FIG. 3 presents a diagram illustrating an exemplary process for the baseband chip to send a control signal to an off-chip component, in accordance with an embodiment of the present invention.

FIG. 3 presents a diagram illustrating an exemplary process for the baseband chip to send a control signal to an off-chip component, in accordance with an embodiment of the present invention. During operation, the baseband chip selects a component for sending a control signal (operation 302), and determines whether the component is a front-end component or a component on the RF IC chip (operation 304). In some embodiments, the components on the RF IC chip and the front-end components are within the same address space, and the addresses of the components on the RF IC chip are kept within a predetermined address range. Hence, based on the address, the system can determine whether the selected component is an RF IC component or a discrete front-end component. In some embodiments, the RF IC chip and the programmable logic chip (which are coupled to the RF front-end components) are both coupled to the baseband chip via an SPI bus, and the programmable logic chip and the RF IC chip are represented by different SPI addresses. In response to determining that the component is a component on the RF IC chip, the baseband chip identifies the SPI address for the RF IC chip (operation 306), and sends a command signal via SPI write to that particular SPI address (operation 308). In response to determining that the component is a discrete RF front-end component, the baseband chip identifies the address of the front-end component mapped by the programmable logic chip (operation 310), and sends a command signal, which include the identified address, via SPI write to the SPI address of the programmable logic chip (operation 312). Upon receiving the command signal, the programmable logic chip delivers the command signal to the corresponding I/O pins based on the mapped address of the front-end component (operation 314).

Figure 4:
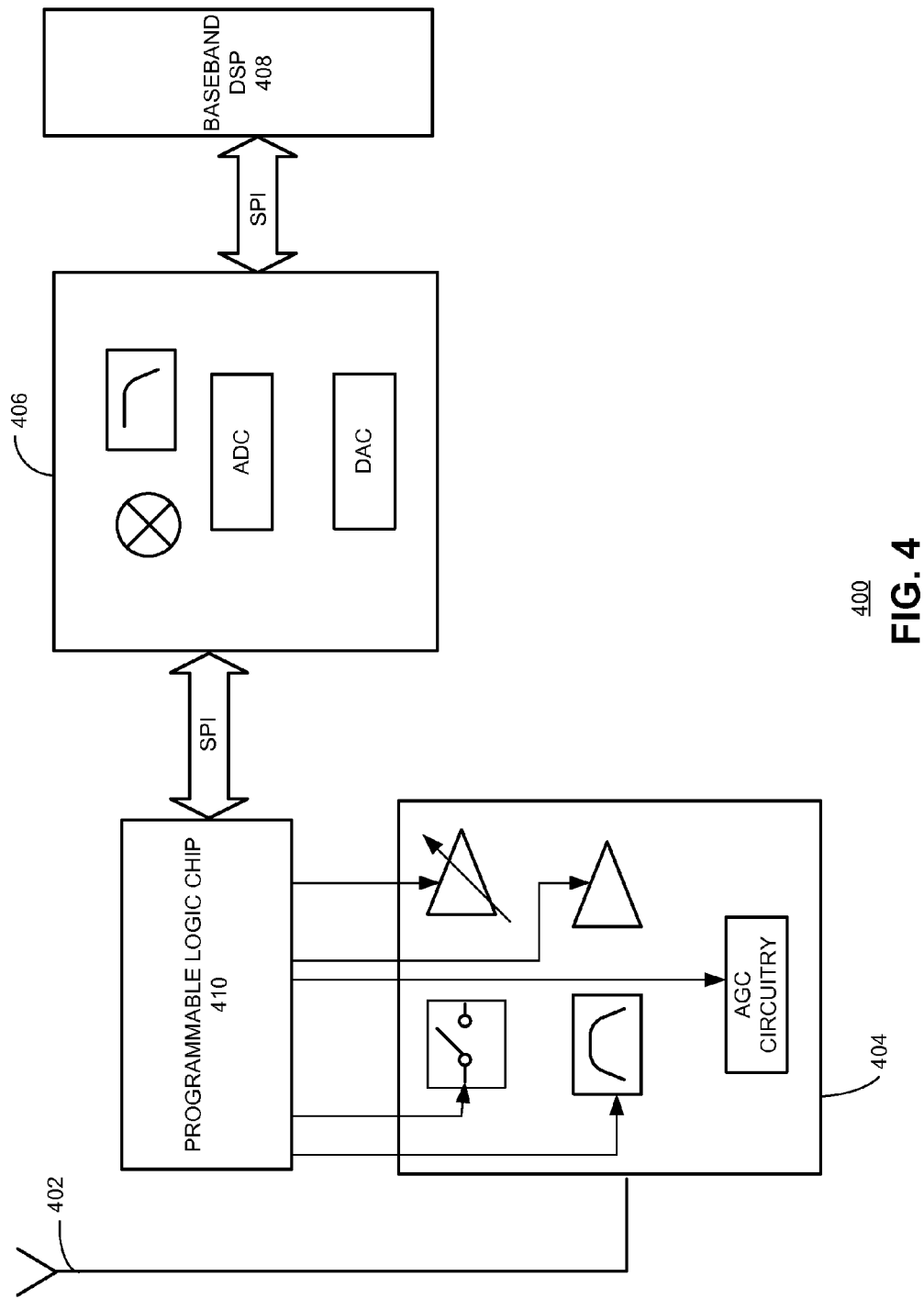
FIG. 4 presents a diagram illustrating the architecture of an exemplary wireless transceiver, in accordance with an embodiment of the present invention.

In addition to the architecture shown in FIG. 2, it is also possible to place the programmable logic chip to between the RF IC and the front-end components. FIG. 4 presents a diagram illustrating the architecture of an exemplary wireless transceiver, in accordance with an embodiment of the present invention. In FIG. 4, transceiver 400 includes an antenna 402, an RF front-end block 404, an RF integrated circuit (IC) chip 406, a baseband DSP 408, and a programmable logic chip 410.

In the example shown in FIG. 4, instead of directly interfacing with programmable logic chip 410, baseband DSP chip 408 is coupled to RF IC chip 406 via a standard interface, such as an SPI interface. The various components on RF IC chip 406 are mapped to different addresses. In one embodiment, the addresses of all components within RF IC chip 406 are within a predetermined range, and addresses outside of this predetermined range can be assigned to the various RF front-end components. During operation, baseband DSP 408 issues a write command, which includes an address and a series of control bits, to RF IC chip 406 via the SPI interface.

RF IC chip 406 examines the address and determines whether the address is within the predetermined range. If so, RF IC chip 406 sends the control bits to the component corresponding to the address. Note that the control bits control the operations of the corresponding component based on the specification of the component. For example, a particular bit may turn a switch on or off. If the address included in the SPI write command exceeds the predetermined range, RF IC chip 406 will not process the write command; instead, it will allow the command to pass through and reach programmable logic chip 410, which in turn examines the address and sends the control bits to a corresponding front-end component via an appropriate interface (which can include, but is not limited to: an SPI interface, a MIPI RFFE interface, an I²C interface, a one-wire interface, etc.) between programmable logic chip 410 and the corresponding front-end component. Similarly, when baseband DSP 408 issues a read command, which includes an address, to RF IC chip 406 via the SPI interface, RF IC chip 406 first examines the address to determine whether the read command is intended for a component on RF IC chip 406. If so, RF IC chip 406 obtains status update from the component and responds to the read command. If not, RF IC chip 406 allows the read command to pass though and reach programmable logic chip 410, which in turn obtains the status update from a corresponding front-end component based on the address and responds to the read command.

The Transceiver

Figure 5:
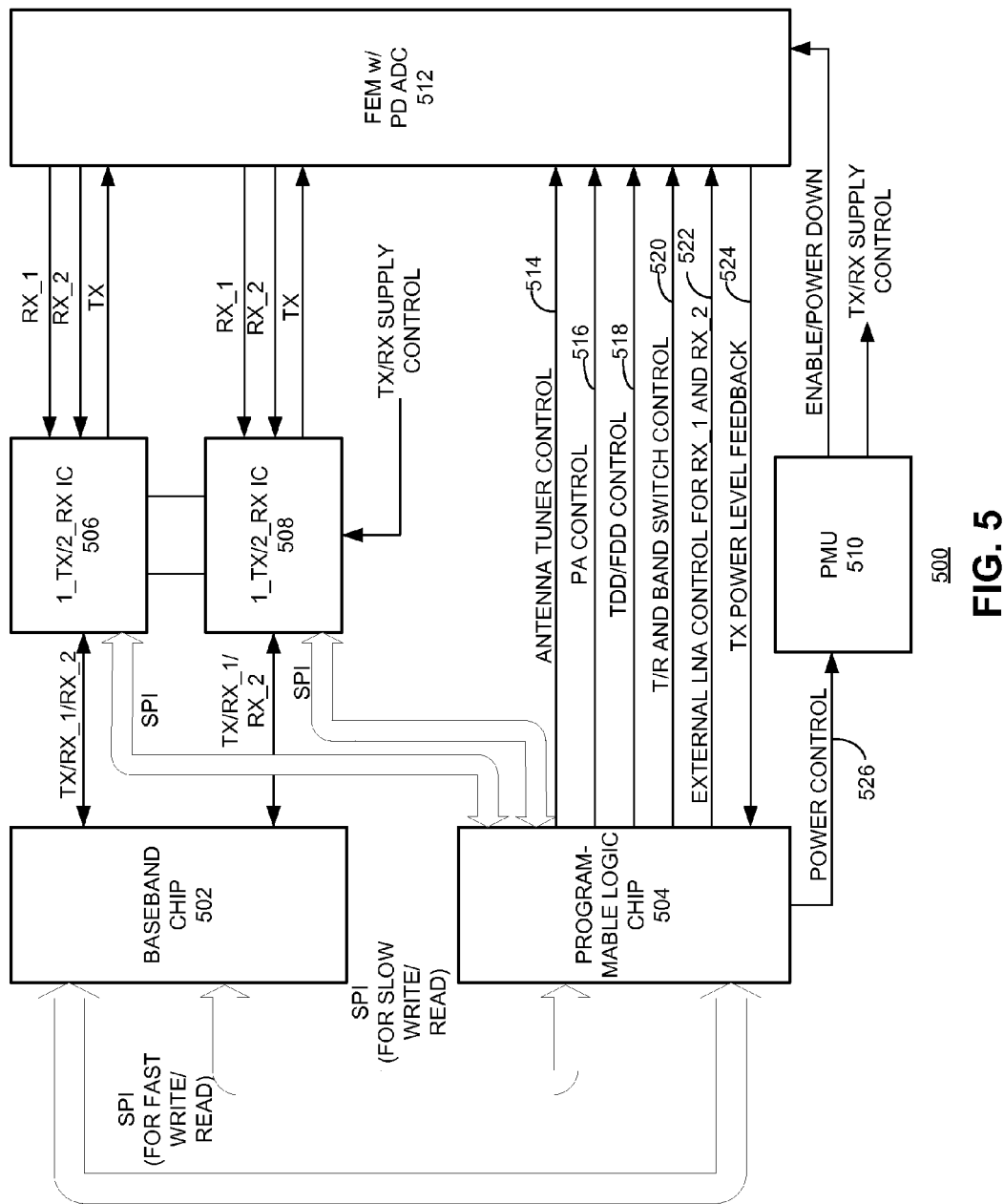
FIG. 5 presents a diagram illustrating in more detail the architecture of an exemplary wideband wireless transceiver, in accordance with an embodiment of the present invention.

FIGS. 2 and 4 illustrate a high-level architecture of wireless transceivers. FIG. 5 presents a diagram illustrating in more detail the architecture of an exemplary wideband wireless transceiver, in accordance with an embodiment of the present invention. In FIG. 5, wideband wireless transceiver 500 includes a baseband chip 502, a programmable logic chip 504, a number of transceiver IC chips (such as TX/RX IC 506 and TX/RX IC 508), a power management unit (PMU) 510, and a multi-component front-end module (FEM) 512, which includes a power detector (PD) and an ADC.

In the example shown in FIG. 5, each transceiver IC chip includes one transmitter and two receivers, with the transmitter receiving data from and receivers sending data to the baseband chip via dedicated data lines. On the other hand, the control signals from baseband chip 502 are routed to the transceiver IC chip via programmable logic chip 504. More specifically, baseband chip 502 can send control signals to programmable logic chip 504 via a standard interface, such as an SPI interface. Programmable logic chip 504 is also coupled to each transceiver IC chip via a standard interface, such as an SPI interface, which enables programmable logic chip 504 to relay control signals to the transceiver IC chips. In some embodiments, each transceiver IC chip is mapped to an address, and baseband chip 502 can control a transceiver IC chip by issuing an SPI write command to a corresponding address. Programmable logic chip 504 then relays the control signals included in the write command to the corresponding transceiver IC chip. In FIG. 5, there are two sets of SPI interfaces available between baseband chip 502 and programmable logic chip 504 to allow both fast and slow SPI write/read operations. Depending on the type of control signal, baseband chip 502 may issue an SPI write/read command to the fast interface or the slow interface.

In addition to the transceiver IC chips, programmable logic chip 504 is coupled to various components on FEM 512 via different customized control and status feedback interfaces. The format of each control or status feedback interface is determined based on the specification of each front-end component. The front-end components that are not part of the IC chips may include, but are not limited to: a power management unit, an antenna tuner, a filter, a band-selection switch, an operation mode switch configured to switch between a time division duplex (TDD) mode and a frequency division duplex (FDD) mode, a power amplifier, a low-noise amplifier, a power detector, and an automatic gain control (AGC) circuitry. Each component will need a dedicated control or status feedback interface. In the example shown in FIG. 5, programmable logic chip 504 provides antenna tuner control via a control interface 514, a power amplifier (PA) control via a control interface 516, a control for switching between frequency division duplex (FDD) and time division duplex (TDD) operating modes via a control interface 518, a control for frequency band selection and transmitter/receiver mode selection via a control interface 520, and LNA control via a control interface 522. Programmable logic chip 504 receives transmitter power level feedback via a feedback interface 524. Moreover, programmable logic chip 510 is coupled to PMU 510 via a control interface 526. These different control and status feedback interfaces allow programmable logic chip 504 to relay control signals to and receive feedback signals from the various front-end components.

During operation, baseband chip 502 sends an SPI write or read command to programmable logic chip 504. The command includes an address that can be mapped to one of the front-end components. Based on the address, programmable logic chip 504 relays the control signals to or collects feedback signals from a corresponding front-end component. For example, if an SPI write command includes an address that can be mapped to a power amplifier, programmable logic chip 504 then relays the control signals (which may include a series of control bits) to the corresponding amplifier via control interface 516. Similarly, if an SPI read command includes an address that can be mapped to a power detector, programmable logic chip 504 then obtains the current reading of the power detector via feedback interface 526 and send it back to baseband chip 502.

In general, compared with traditional schemes that rely on dedicated I/O pins to enable the baseband chip to control the various different RF front-end components, in embodiments of the present invention, the baseband chip only needs to provide control signals to a programmable logic chip via a standard interface. Note that such as an arrangement has significantly simplifies and standardizes the design of the baseband chip. Moreover, the programmable logic chip can be placed in a location that is proximate to the RF front-end components, thus significantly reducing the PCB routing complexity.

Note that the architecture shown in FIGS. 2 and 4 is merely exemplary and should not limit the scope of this disclosure. For example, in FIG. 2, the baseband chip and the programmable logic chip are coupled together via an SPI interface. In reality, any types of interface that allow the baseband chip to send a series of bits, with some bits carrying address information and some bits carrying control information to the programmable logic chip, can be used as long as there is an agreement between the baseband chip and the programmable logic chip in terms of the bit format. Similarly, the coupling between the programmable logic chip and the RF chip can also have formats other than SPI.

In addition, FIGS. 2 and 4 only show one set of SPI connections between the baseband chip and the programmable logic chip/RF IC chip. In practice, multiple sets of connections can be included to allow simultaneous write and read operations, and fast/slow write/read operation modes.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. An RF front-end system, comprising:
   one or more RF front-end components;
   a programmable logic device having a baseband interface for coupling to a baseband digital signal processor (DSP), and a set of component interfaces for coupling to the one or more RF front-end components; and
   an RF IC chip situated between the baseband DSP and the programmable logic device;
   wherein the programmable logic device is configured to:
      receive, from the baseband DSP via the baseband interface, a command, wherein the command includes an address and a control signal;
      map the address included in the received command to a component interface from the set of component interfaces; and
      send the control signal to the mapped component interface, thereby enabling the baseband DSP to control a front-end component coupled to the programmable logic device via the mapped component interface; and
   wherein the RF IC chip is configured to:
      receive, from the baseband DSP, a second command;
      determine whether a second address included in the second command is within a predetermined range; and
      in response to determining the second address being outside of the predetermined range, forward the second command to the programmable logic device.

2. The RF front-end system of claim 1, wherein the baseband interface includes one of:
   a serial peripheral interface (SPI);
   an I2C interface;
   a general purpose input/output interface; and
   a serial one-wire interface.

3. The RF front-end system of claim 1, wherein the programmable logic device includes at least one of:
   a complex programmable logic device (CPLD);
   a field-programmable gate array (FPGA); and
   a programmable logic device (PLA).

4. The RF front-end system of claim 1, wherein the set of component interfaces include one or more of:
   a serial peripheral interface (SPI);
   an I2C interface;
   a general purpose input/output interface; and
   a serial one-wire interface.

5. The RF front-end system of claim 1, wherein the command includes at least one of: a write command and a read command.

6. The RF front-end system of claim 5, wherein the programmable logic device is further configured to:
   in response to the read command, obtain a status reading from the identified component interface for the front-end component; and
   send the status reading to the baseband DSP via the baseband interface.

7. The RF front-end system of claim 1, wherein the RF front-end components include one or more of:
   one or more of integrated circuit (IC) chips;
   a power management unit;
   an antenna tuner;
   a filter;
   a band-selection switch;
   an operation mode switch configured to switch between a time division duplex (TDD) mode and a frequency division duplex (FDD) mode;
   a power amplifier;
   a low-noise amplifier;
   a power detector; and
   an automatic gain control (AGC) circuitry.

8. The RF front-end system of claim 7, wherein the RF front-end components include at least one transceiver IC chip.

9. The RF front-end system of claim 1, wherein the programmable logic device further comprises an additional baseband interface to enable a slow write/read operation between the baseband DSP and the programmable logic device.

10. The RF front-end system of claim 1, wherein the RF IC chip is further configured to:
   in response to determining the second address being within the predetermined range, map the second address to an RF IC component within the RF IC chip; and
   forward a control signal within the second command to the mapped RF IC component.

* * * * *